US009446388B2

United States Patent
Yi et al.

(10) Patent No.: US 9,446,388 B2
(45) Date of Patent: Sep. 20, 2016

(54) METAL COMPLEX OF FLUORINATED TIN OXIDE AND TITANIUM OXIDE AND PREPARATION METHOD THEREOF

(71) Applicant: Korea Institute of Energy Research, Daejeon (KR)

(72) Inventors: Kwang Bok Yi, Daejeon (KR); Soon Jin Kwon, Daejeon (KR); Nu Ri Jeon, Daejeon (KR); Hyun-Seog Roh, Gangwon-do (KR); Wang Lai Yoon, Daejeon (KR); Kee Young Koo, Daejeon (KR); Un-Ho Jung, Daejeon (KR); Woohyun Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 124 days.

(21) Appl. No.: 14/446,882

(22) Filed: Jul. 30, 2014

(65) Prior Publication Data

US 2015/0051069 A1 Feb. 19, 2015

(30) Foreign Application Priority Data

Aug. 19, 2013 (KR) .................. 10-2013-0098035

(51) Int. Cl.

| | | |
|---|---|---|
| *B01J 27/135* | (2006.01) | |
| *C01G 19/02* | (2006.01) | |
| *C01G 23/047* | (2006.01) | |
| *C01B 3/16* | (2006.01) | |
| *B01J 21/06* | (2006.01) | |
| *B01J 23/42* | (2006.01) | |
| *B01J 35/00* | (2006.01) | |
| *B01J 37/02* | (2006.01) | |

(52) U.S. Cl.
CPC ............. *B01J 27/135* (2013.01); *B01J 21/063* (2013.01); *B01J 23/42* (2013.01); *B01J 35/002* (2013.01); *B01J 37/0207* (2013.01); *C01B 3/16* (2013.01); *C01G 19/02* (2013.01); *C01G 23/047* (2013.01); *C01B 2203/0283* (2013.01); *C01B 2203/1041* (2013.01); *C01P 2004/03* (2013.01); *C01P 2004/82* (2013.01); *C01P 2004/84* (2013.01); *C01P 2006/12* (2013.01)

(58) Field of Classification Search
None
See application file for complete search history.

(56) References Cited

FOREIGN PATENT DOCUMENTS

WO   WO 2013/042048 A1    3/2013

OTHER PUBLICATIONS

European Patent Office, Communication of Extended European Search Report, issued Oct. 28, 2014, against corresponding European Patent Application No. 14179422.2.

Tarek A. Kandiel et al., "Direct Synthesis of Photocatalytically Active Rutile TiO2, Nanorods Partly Decorated with Anatase Nanoparticles", J. Phys. Chem., 2010, 114, pp. 4909-4915.

Yulong Liao et al., "Controllable synthesis of brookite/anatase/rutile TiO2 nanocomposites and single-crystalline rutile nanorods array", J. Mater. Chem., 2012, 22, pp. 7937-7944.

C. Fabrega et al., "Optimization of surface charge transfer processes on rutile TiO2 nanorods photoanodes for water splitting", J. Hydrogen Energy, 38 (2013) pp. 2979-2985.

(Continued)

*Primary Examiner* — Alexandre Ferre
(74) *Attorney, Agent, or Firm* — Hammer & Associates, P.C.

(57) ABSTRACT

Disclosed is a metal complex including: a tin oxide; titanium oxide nanorods in a rutile phase formed on the tin oxide; and titanium oxide nanoparticles in an anatase phase formed on the titanium oxide nanorods in a rutile phase, and a preparation method thereof, and can be used as a catalyst support in various forms.

4 Claims, 3 Drawing Sheets

(56) References Cited

OTHER PUBLICATIONS

Lei Pan et al., "TiO2 rutile-anatase core-shell nanorod and nanotube arrays for photocatalytic applications", RSC Adv., 2013, 3, pp. 3566-3571.

Zhen Wei et al., "Solvothermal Growth of Well-Aligned TiO2 Nanowire Arrays for Dye-Sensitized Solar Cell: Dependence of Morphology and Vertical Orientation Upon Substrate Pretreatment", Int. J. Electrochem Sci., 6 (2011), pp. 1871-1879.

Zhao Zhao et al., "Phase control of hierarchically structured mesoporous anatase TiO2 microspheres covered with {001} facets", J. Mater. Chem, 22 (2012) pp. 21965-21981.

METAL COMPLEX OF FLUORINATED TIN OXIDE AND TITANIUM OXIDE AND PREPARATION METHOD THEREOF

CROSS-REFERENCE TO RELATED APPLICATION

This application claims priority to and the benefit of Korean Patent Application No. 2013-0098035, filed on Aug. 19, 2013, the disclosure of which is incorporated herein by reference in its entirety.

BACKGROUND

1. Field of the Invention

The present invention relates to a metal complex of a fluorinated tin oxide and a titanium oxide, and a preparation method thereof.

2. Discussion of Related Art

In recent years, since energy consumption has been rapidly increasing worldwide, demand and supply of fossil energy has been unstable. For a stable supply of energy, various energy conversion technologies have been actively studied. In order to replace fossil fuel, alternative energy technology is currently under development. However, since people are heavily dependent on fossil fuels, a use of the fossil fuels is not expected to be decreased for a long time. Therefore, studies on production and a use of hydrogen by converting or reforming the conventional fossil fuels such as oil or coal have been carried out. Hydrogen energy is clean energy that does not produce carbon dioxide by combustion and can be readily used in many households along with development of reforming reactors capable of reforming the conventional gas to produce hydrogen. The hydrogen energy can be used not only for general combustion but also as a fuel gas for a fuel cell. A representative method of producing such hydrogen uses a methane-steam reforming reaction and a water-gas shift reaction. In the methane-steam reforming reaction, methane is reacted with steam at 600 to 800° C. in the presence of a nickel catalyst to produce hydrogen and carbon monoxide, and in the water-gas shift reaction, carbon monoxide produced from the downstream of a methane-steam reforming reactor is reacted again with steam to produce hydrogen and carbon dioxide. Typically, as a temperature of the water-gas shift reaction is increased, a reaction rate is increased but a conversion rate is decreased. On the contrary, as the temperature of the water-gas shift reaction is decreased, the reaction rate is decreased but the conversion rate is increased. Therefore, the water-gas shift reaction is composed of two steps: a high temperature water-gas shift reaction carried out at about 400° C.; and a low temperature water-gas shift reaction carried out at about 200° C. If a reaction rate of the low temperature water-gas shift reaction is increased, there is no need to carry out the conventional two-step water-gas shift reaction. Therefore, a recent trend of the study is focusing on development of a low temperature water-gas shift reaction catalyst capable of increasing the reaction rate.

As a conventional low temperature water-gas shift reaction catalyst, a $Cu/ZnO/Al_2O_3$-based oxide catalyst has been mainly used. Further, catalysts prepared by immersing Pt, Pd, Cu, Ni, or the like in ceria ($CeO_2$) carriers having high oxygen mobility and a high oxygen storage capacity have shown excellent activity and thus have attracted a lot of attention. According to Korean Patent Laid-open Publication No. 2010-0089316, it is reported that binary active metals, Cu and Mo, are immersed at a certain content ratio in a ceria-zirconia ($Ce_x$—$Zr_{1-x}O_2$) carrier, so that it is possible to maintain high catalyst activity and also obtain high durability against thermal cycling at 250° C. or more as compared with a Cu-based catalyst or other conventional catalysts commonly used.

SUMMARY OF THE INVENTION

The present invention is directed to providing a metal complex of a fluorinated tin oxide and a titanium oxide, and a preparation method thereof.

One aspect of the present invention provides a metal complex including: a tin oxide; titanium oxide nanorods in a rutile phase grown on the tin oxide; and titanium oxide nanoparticles in an anatase phase coated on the titanium oxide nanorods in a rutile phase.

Another aspect of the present invention provides a preparation method of the metal complex, specifically including: preparing a tin oxide; treating the prepared tin oxide with a titanium chloride solution and growing titanium oxide nanorods in a rutile phase on the tin oxide; and coating titanium oxide nanoparticles in an anatase phase on the grown titanium oxide nanorods in a rutile phase.

BRIEF DESCRIPTION OF THE DRAWINGS

The above and other objects, features, and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
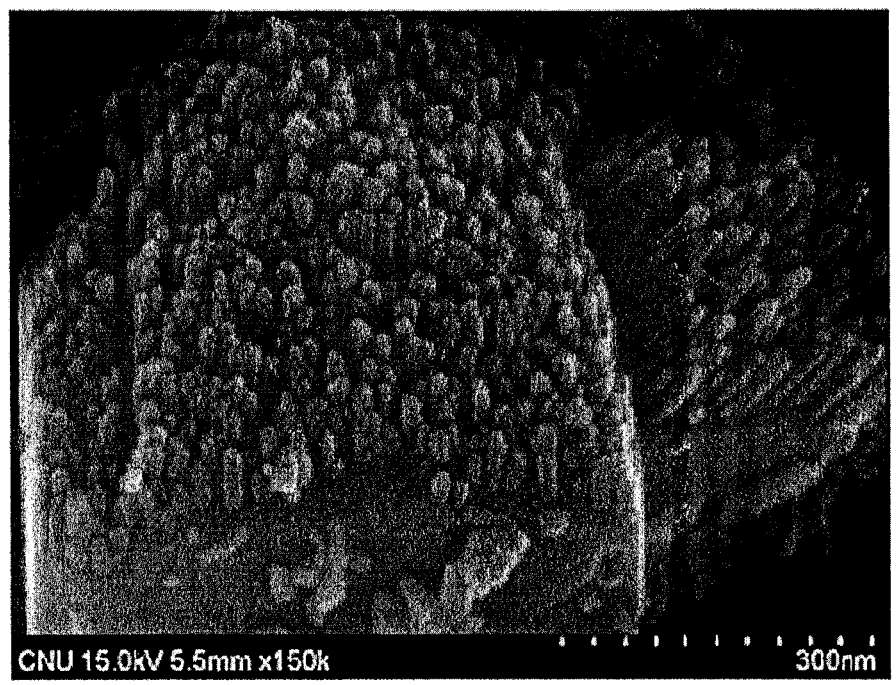
FIGS. 1 and 2 are scanning electron micrographs of a metal complex according to an exemplary embodiment of the present invention.

Hereinafter, the present invention will be described with reference to Examples in detail. However, the present invention is not limited to these Examples.

The present invention suggests a metal complex having a systematic structure prepared by growing titanium oxide nanorods in a rutile phase on a tin oxide and coating titanium oxide nanoparticles in an anatase phase thereon, and a preparation method thereof. This metal complex can be used as a catalyst support, and when a water-gas shift reaction occurs on a surface of a catalytic active material, the titanium oxide in multiple phases including an anatase phase and a rutile phase has a small band gap, and thus the metal complex can provide a path through which electrons can be drifted at a high velocity and can shift electrons and oxygen ions to the tin oxide. Since tin oxide has high electron drift velocity and is capable of absorbing oxygen ions, the tin oxide prevents electrons from being shifted again to a catalyst surface to be recombined therewith. Further, the tin oxide keeps carbon monoxide adsorbed on the surface of the catalytic active material in an unstable state and thus forms conditions for a rapid reaction with steam.

Most of the materials typically used as a catalyst support are single metal oxides or complex metal oxides, and have a single form including pores in a single phase or multiple phases although prepared in various preparation methods. Therefore, such a catalyst support has a uniform composition, and a physiochemical property of the catalyst support is determined depending on a composition.

A metal complex of the present invention will be explained in detail as follows.

A metal complex of the present invention includes a tin oxide; titanium oxide nanorods in a rutile phase formed on the tin oxide; and titanium oxide nanoparticles in an anatase phase formed on the titanium oxide nanorods in a rutile phase.

The tin oxide may be a fluorinated tin oxide. For example, the fluorinated tin oxide can be prepared by using a hydrofluoric acid solution (HF solution). The prepared fluorinated tin oxide may have a substantially spherical or irregular form. The term "spherical" includes not only a theoretically complete sphere but also a three-dimensional structure in a round shape, and comprehensively includes a spheroid having a relatively long axis or a sphere whose surface is not smooth.

A tin oxide is typically present as SnO or $SnO_2$. $SnO_2$ is an n-type semiconductor having a significant conductivity at room temperature. Further, the tin oxide has a wide direct transition band gap (Eg=3.6 eV) and can be prepared at low costs and thus has attracted a lot attention as an important functional semiconductor material in the microelectronic engineering and photoelectronic engineering fields. For example, the tin oxide can be used as an anode material of a lithium battery, a transparent electrode of a solar cell, electrochromic glass, glass coating, a heat reflector, a nanofiltration membrane, a catalytic agent, a photocatalyst, and a gas sensor.

A titanium oxide is an oxide of titanium and may be referred to as titanium dioxide, titanium anhydride, or titania having a chemical formula of $TiO_2$. The titanium oxide is known as having three types of variant structures: a rutile type stable at a high temperature; an anatase type stable at a low temperature; and a brookite type stable at an intermediate temperature.

The metal complex may satisfy Mathematical Formula 1 below.

$$2 \leq D1/D2 \leq 80 \quad \text{[Mathematical Formula 1]}$$

In Mathematical Formula 1,

D1 represents a mean length of the titanium oxide nanorods in a rutile phase, and D2 represents a mean particle diameter of the titanium oxide nanoparticles in an anatase phase.

To be more specific, a value of D1/D2 described in Mathematical Formula 1 may be in the range of 3 to 30, and 5 to 25.

For example, the mean length of titanium oxide nanorods in a rutile phase may be in a range of 10 nm to 80 nm, and specifically, 20 nm to 50 nm. Further, the mean particle diameter of the titanium oxide nanoparticles in an anatase phase may be in the range of 1 nm to 8 nm, and specifically, 2 nm to 5 nm.

Thus, it can be seen that in the metal complex of the present invention, titanium oxide in different formulations are complexly used. Therefore, it is confirmed that the metal complex of the present invention can promote electron drift and oxygen ion shift occurring on a surface of a catalytic active material, thereby maximizing a catalytic reaction rate.

In the present invention, the term "mean diameter" refers to an average diameter of particles, and the term "mean length" refers to an average length of a major axis when an axis is divided into the major axis and a minor axis.

A weight ratio of the titanium oxide nanorods in a rutile phase to the titanium oxide nanoparticles in an anatase phase may be in the range of 5:95 to 30:70, and specifically 8:92 to 20:80 or 9:91 to 12:88. By controlling the contents of the titanium oxide nanorods in a rutile phase and the titanium oxide nanoparticles in an anatase phase to be in the above range, in a water-gas shift reaction occurring on a surface of a catalytic active material, it is possible to effectively reduce a band gap between multiple phases of the anatase phase and the rutile phase and induce electron drift at a higher velocity.

Further, the metal complex of the present invention can be used as a catalyst support, and more specifically, as a support of a catalyst for a water-gas shift reaction. Typically, as a temperature of the water-gas shift reaction is increased, a reaction rate is increased but a conversion rate is decreased, and as the temperature of the water-gas shift reaction is decreased, the reaction rate is decreased but the conversion rate is increased. Therefore, the water-gas shift reaction is composed of two steps: a high temperature water-gas shift reaction carried out at about 400° C.; and a low temperature water-gas shift reaction carried out at about 200° C. If a reaction rate of the low temperature water-gas shift reaction is increased, there is no need to carry out the conventional two-step water-gas shift reaction. In the metal complex of the present invention, the titanium oxide nanoparticles in an anatase phase stable at a low temperature are positioned closest to the catalytic active material. The titanium oxide nanoparticles in an anatase phase drift electrons generated in the catalytic reaction to a fluorinated tin oxide through the nanorods in a rutile phase at a high velocity and disperse the electrons to adjacent particles. Oxygen ions generated together with the electrons pass through the titanium oxide and are absorbed by the fluorinated tin oxide and then dispersed to adjacent particles, thereby maximizing catalytic activity.

Furthermore, the present invention provides a preparation method of the above-described metal complex. The preparation method of the metal complex includes: treating a tin oxide with a titanium chloride solution and growing titanium oxide nanorods in a rutile phase on the tin oxide; and coating titanium oxide nanoparticles in an anatase phase on the grown titanium oxide nanorods in a rutile phase.

The preparation method of the metal complex will be explained in more detail as follows.

First, prior to the above-described preparation method, a step of preparing a tin oxide may be carried out. A precursor of the tin oxide may include one or more materials selected from the group consisting of $SnCl_4\text{-}5H_2O$, $SnCl_2$, and $SnCl_2\text{-}2H_2O$. To be specific, $SnCl_4\text{-}5H_2O$ may be used. For example, $SnCl_4\text{-}5H_2O$ is dissolved in a hydrofluoric acid solution (HF solution). Then, precipitation is induced by addition of an ammonia solution ($NH_4OH$). Thereafter, a resultant product in the form of slurry is dried and calcined to produce a tin oxide. A weight ratio of the $SnCl_4\text{-}5H_2O$ and the hydrofluoric acid solution (HF solution) may be in the range of 50:1 to 10:1, and specifically, 30:1 to 15:1. By controlling the ratio of the $SnCl_4\text{-}5H_2O$ and the hydrofluoric acid solution (HF solution) to be in the above range, it is possible to increase a production yield of the tin oxide and also possible to effectively prepare the tin oxide having a desired size.

Since the hydrofluoric acid solution is used for preparing tin oxide, a fluorinated tin oxide can be produced. The tin oxide has a lattice structure similar to that of titanium oxide in a rutile phase, and thus, it is possible to easily grow the titanium oxide nanorods in a rutile phase on the fluorinated tin oxide.

Then, a step of growing the titanium oxide nanorods in a rutile phase on the tin oxide may be carried out. For example, a sol-gel method, a heating method, a method using a solution, a chemical vapor deposition method, an atomic layer deposition method, and a sputtering method may be used.

Since a titanium chloride solution is used for treating the tin oxide, a titanium oxide can be easily grown on the tin oxide. The tin oxide treated with the titanium chloride is put into a reactor together with a hydrochloric acid solution and 4-butyl titanate ($C_{16}H_{36}O_4Ti$) and through hydrothermal synthesis for 8 to 15 hours, titanium oxide nanorods in a rutile phase are grown on the tin oxide particles. A temperature of the reactor for the hydrothermal synthesis may be in the range of 100° C. to 200° C., and specifically 150° C.

Further, in the preparation method of the metal complex of the present invention, a step of coating titanium oxide nanoparticles in an anatase phase on the titanium oxide nanorods in a rutile phase grown on the tin oxide may be carried out. For example, the tin oxide on which the titanium oxide nanorods in a rutile phase are grown is put into the reactor together with a sulfuric acid solution and titanate ($C_{16}H_{36}O_4Ti$) and then coated with titanium oxide nanoparticles in an anatase phase through hydrothermal synthesis. A temperature of the reactor for the hydrothermal synthesis may be in the range of 100° C. to 200° C., and specifically 150° C.

Hereinafter, the present invention will be explained in more detail with reference to Examples and Experimental Example according to the present invention. However, the scope of the present invention is not limited to Examples and Experimental Example provided below.

Example

Preparation of Metal Complex

Preparation of Fluorinated Tin Oxide

In order to prepare a tin oxide, 22.3 g of $SnCl_4 \cdot 5H_2O$ and 1.14 g of a hydrofluoric acid solution (50%) were put into 60 ml of distilled water and stirred on a magnetic plate for 20 minutes. With slow addition of an ammonia solution (25 wt %) to the stirred mixture, precipitation was induced and stirring continued. When precipitation did not occur any longer, the addition of the ammonia solution was stopped, and stirring continued for an additional 30 minutes to obtain slurry. The obtained slurry was put into a forced convection dryer and dried at a set temperature of 120° C. for 24 hours. After drying, the resultant solids were lightly ground and then put into a heating furnace and calcined at 750° C. for 90 minutes to obtain fluorinated tin oxide particles.

2) Coating of Titanium Oxide in Rutile Phase

The tin oxide as obtained in the step 1) was put into 50 ml of a $TiCl_4$ solution (0.4 M) and left for 1 hour and then taken out to dry. The dried particles were put into an autoclave having a Teflon liner, and 30 ml of HCl (98%), 30 ml of distilled water, and 0.5 ml of 4-butyl titanate were added thereto with stirring, and the autoclave was sealed. The sealed autoclave was put into an oven at 150° C. and left for 20 hours. 20 hours later, the solution was taken out and filtered, and then washed with distilled water and dried to obtain 2 g of a tin oxide on which 10.1% titanium oxide in a rutile phase was grown.

3) Coating of Titanium Oxide in Anatase Phase

The tin oxide on which a titanium oxide in a rutile phase was grown as obtained in the step 2) was put into a $TiCl_4$ solution (0.4 M) and left for 1 hour and then taken out to dry. The dried particles were put into an autoclave having a Teflon liner, and 35 ml of $H_2SO_4$ (98%), 35 ml of distilled water, and 2 ml of 4-butyl titanate were added thereto with stirring, and the autoclave was sealed. The sealed autoclave was put into an oven at 150° C. and left for 12 hours. 12 hours later, the solution was taken out and filtered, and then washed with distilled water and dried. The dried particles were calcined at 400° C. for 2 hours to obtain a structure coated with 89.9% titanium oxide in an anatase phase.

Figure 2:

FIG. 1 and FIG. 2 illustrate scanning electron micrographs of a metal complex according to the present invention. Referring to FIG. 1, it can be seen that a metal complex having a structure and a composition suggested in the present invention includes a tin oxide having a mean diameter of 0.8 to 1 μm, and titanium oxide nanorods in a rutile phase grown thereon have a mean length of 30 to 40 nm. Further, referring to FIG. 2, it can be seen that titanium oxide nanoparticles in an anatase phase coated on the titanium oxide nanorods in a rutile phase have a mean diameter of 3 nm.

Figure 3:
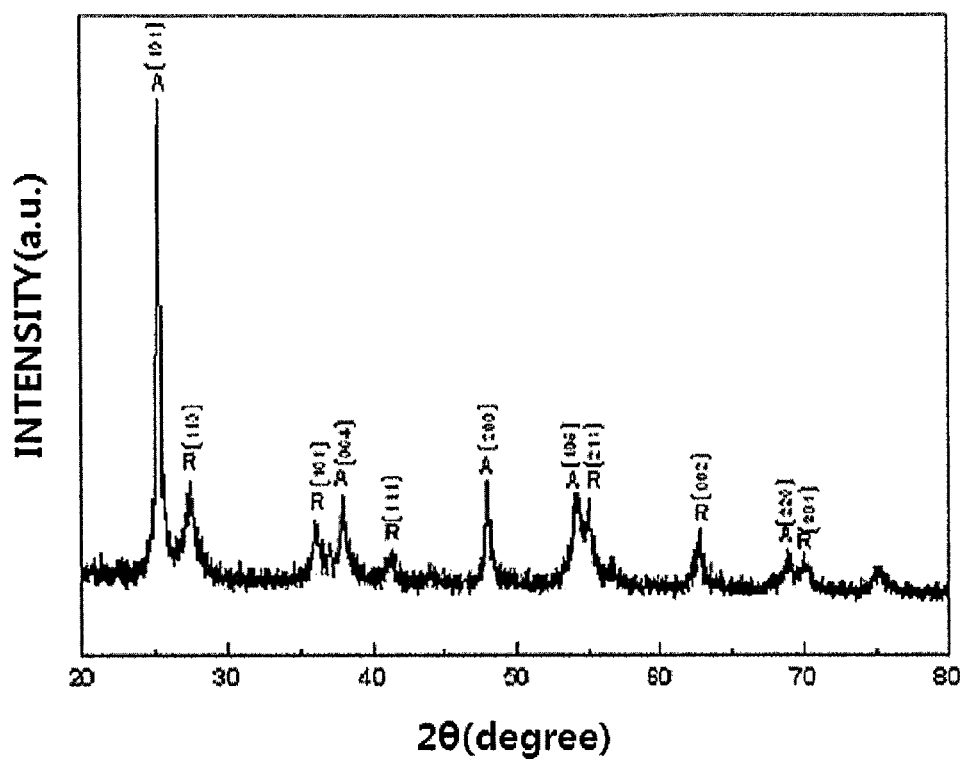
FIG. 3 shows a result of an X-ray diffraction analysis on a metal complex according to an exemplary embodiment of the present invention.

Further, FIG. 3 shows a result of an X-ray diffraction analysis on a metal complex according to the present invention. Referring to FIG. 3, it can be seen from the result of the X-ray diffraction analysis that a titanium oxide in a rutile phase and a titanium oxide in an anatase phase co-exist in the metal complex.

Comparative Example

Preparation of $CeO_2$ Support $Ce(NO_3)_3 \cdot 6H_2O$ was dissolved in distilled water and then heated up to 80° C. At a constant temperature, 15 wt % KOH as a precipitant was added thereto to adjust a pH to 10.5 and then aged for 3 days while maintaining the temperature of 80° C. In order to remove $K^+$ ions remaining in the aged solution, washing with distilled water was carried out several times. The prepared precipitate was dried at 110° C. and calcined at 500° C. for 6 hours to prepare a $CeO_2$ support.

Preparation Example

Preparation of Catalyst Using Metal Complex According to Present Invention

With 1 g of each support prepared in Example and Comparative Example, 1 wt % platinum was coated using an impregnation method. The sample coated with platinum underwent a drying process and a calcination process to prepare a catalyst for a water-gas shift reaction.

Experimental Example

Comparison of Low Temperature

Figure 4:
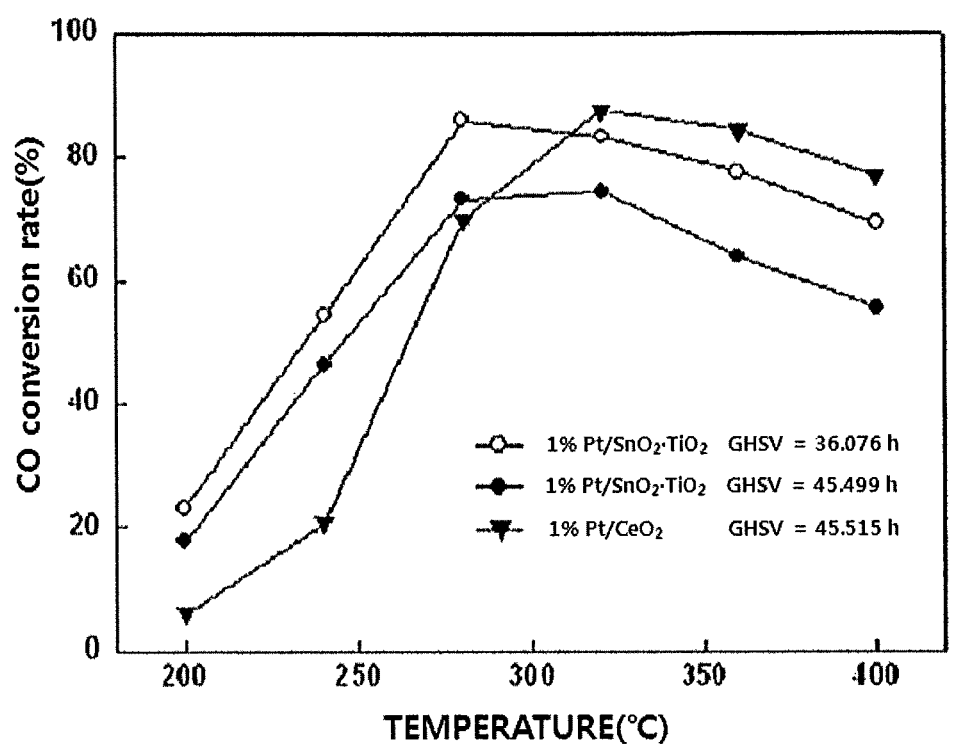
FIG. 4 shows a result of a water-gas shift reaction using a metal complex according to an exemplary embodiment of the present invention.

Water-Gas Shift Reaction 0.0478 g of the prepared catalyst was put into a ¼ inch quartz tube and underwent a reduction process using 5% $H_2/N_2$ mixed gas at 400° C. for 1 hour, and then, a temperature of the reactor was lowered to 200° C. Steam and a mixed gas (59.81% $H_2$, 19.92% $N_2$, 1.06% $CH_4$, 10.1% $CO_2$, and 9.11% CO) were injected to the reactor to adjust a gas hourly space velocity (GHSV) to 36,076 $h^{-1}$ and 45,499 h⁻¹, and then a low temperature water-gas shift reaction was carried out. At each time of increasing a temperature by 50° C., a carbon monoxide conversion rate was recorded. Further, in order to make a comparison in catalyst performance, using a CeO$_2$ catalyst coated with 1% platinum, an experiment was carried out in the same condition at a GHSV of 45,499 h⁻¹. Reaction conditions and a gas composition for the low temperature water-gas shift reaction are shown in Table 1 and Table 2, respectively. A result of the experiment was as shown in FIG. 4. Referring to FIG. 4, it is shown that when the support prepared by the method suggested in the present invention is used, high performance and high stability are obtained at a low temperature range (300° C. or less) as compared with a CeO$_2$ support which is recently known as having high performance.

TABLE 1

Conditions for Low Temperature Water-Gas Shift Reaction

| Catalyst | Reduction condition (5% H$_2$/N$_2$ bal.) | Catalyst weight (mg) | Gas hourly space velocity (GHSV) (h⁻¹) |
|---|---|---|---|
| 1% Pt/SnO$_2$—TiO$_2$ | 400° C., 1 hour | 47.8 | 36,076 |
|  |  | 37.9 | 45,499 |
| 1% Pt/CeO$_2$ | 400° C., 1 hour | 36.6 | 45,515 |

TABLE 2

Gas Composition for Low Temperature Water-Gas Shift Reaction

| H$_2$ | N$_2$ | CH$_4$ | CO$_2$ | CO | Total |
|---|---|---|---|---|---|
| 59.81 | 19.92 | 1.06 | 10.10 | 9.11 | 100 |

The experimental result shows that when the support according to the present invention is used as a support of a catalyst required for a reaction such as a low temperature water-gas shift reaction accompanied with electron drift and oxygen ion shift, it is possible to promote electron drift and oxygen ion shift occurring on a surface of a catalytic active material, thereby maximizing a catalytic reaction.

The titanium oxide nanoparticles in an anatase phase positioned closest to the catalytic active material drift electrons generated in the catalytic reaction to a fluorinated tin oxide through the nanorods in a rutile phase at a high velocity and disperse the electrons to adjacent particles. Oxygen ions generated together with the electrons pass through the titanium oxide and are absorbed by the fluorinated tin oxide and then dispersed to adjacent particles, thereby maximizing catalytic activity.

A metal complex according to an exemplary embodiment of the present invention can be used as a catalyst support, and can promote electron drift and oxygen ion shift occurring on a surface of a catalytic active material, thereby maximizing a catalytic reaction rate.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A catalyst for a water-gas shift reaction comprising:
   (a) a catalyst support comprising:
      (a-1) tin oxide particles having a mean diameter of 0.8 to 1 μm;
      (a-2) titanium oxide nanorods in a rutile phase grown in the longitudinal direction on the tin oxide particles, wherein the titanium oxide nanorods in a rutile phase have a mean length of 30 to 40 nm; and
      (a-3) titanium oxide nanoparticles in an anatase phase formed on the titanium oxide nanorods in a rutile phase, wherein the titanium oxide nanoparticles have a mean diameter of 1 nm to 8 nm; and
   (b) a catalytic active material,
   wherein the catalyst support is coated by the catalytic active material.

2. The catalyst for a water-gas shift reaction of claim 1, wherein the tin oxide particles are fluorinated tin oxide particles.

3. The catalyst for a water-gas shift reaction of claim 1, wherein the catalyst support satisfies Mathematical Formula 1:

$$2 \leq D1/D2 \leq 80 \qquad \text{[Mathematical Formula 1]}$$

wherein in Mathematical Formula 1,
D1 represents a mean length of the titanium oxide nanorods in a rutile phase, and
D2 represents a mean particle diameter of the titanium oxide nanoparticles in an anatase phase.

4. The catalyst for a water-gas shift reaction of claim 1, wherein a weight ratio of the titanium oxide nanorods in a rutile phase to the titanium oxide nanoparticles in an anatase phase is in the range of 5:95 to 30:70.

\* \* \* \* \*